Jan. 3, 1928.
G. D. EARWOOD
1,655,361
TRAP
Filed Feb. 24, 1926
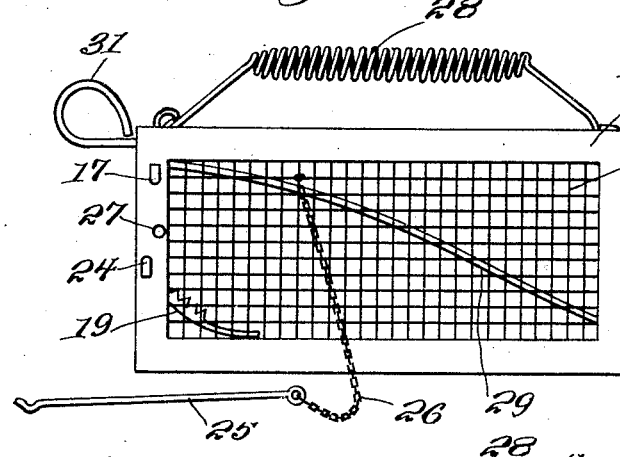
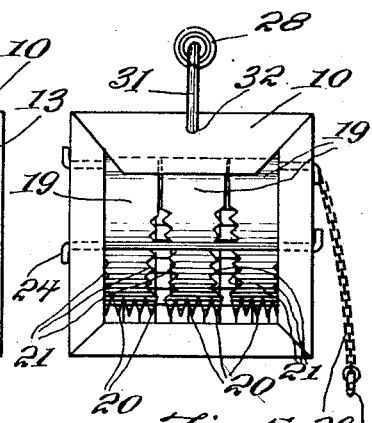
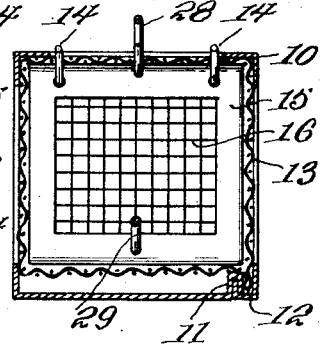
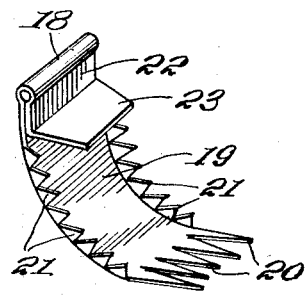
George Deverow Earwood
INVENTOR
Victor J. Evans
ATTORNEY
WITNESS:

Patented Jan. 3, 1928.

1,655,361

UNITED STATES PATENT OFFICE.

GEORGE DEVEROW EARWOOD, OF GASTONIA, NORTH CAROLINA, ASSIGNOR OF ONE-HALF TO EMANUEL FROHMAN, OF GASTONIA, NORTH CAROLINA.

TRAP.

Application filed February 24, 1926. Serial No. 90,416.

This invention relates to improvements in animal traps, the general object being the provision of an elongated frame of box like enclosure having a false bottom beneath which the bait may be arranged and drops provided in one end of the trap to permit the entrance of an animal therein but prevent exit therefrom.

Another object of my invention resides in the provision of a manually operated door within the opposite end of the trap to facilitate the removal of the animal so caught.

With the above and other objects in view, the invention further includes the following novel features and details of construction, to be hereinafter more fully described, illustrated in the accompanying drawings and pointed out in the appended claim.

In the drawing:—

Figure 1 is a side elevation of my invention.

Figure 2 is a longitudinal sectional view taken therethrough.

Figure 3 is a sectional top plan view thereof.

Figure 4 is an elevation of the entrance end of the trap.

Figure 5 is a vertical sectional view taken on line 5—5 of Figure 2.

Figure 6 is a perspective of one of the drops per se.

Figure 7 is a fragmentary elevation of the operating rod for the manually operated exit door.

Referring to the drawing in detail, wherein like characters of reference denote corresponding parts, the reference character 10 indicates an elongated frame or box like inclosure formed of angular strips, one of which arranged upon the bottom and upon one side thereof forming a channel portion 11 within which one side edge of a channel shaped member 12 may be inserted in securing means on opposite ends of a single length of screen wire 13 within the remaining portion thereof and which screen forms the sides, bottom and top of the trap, the bottom formed by the length of screen wire 13 being spaced an appreciable distance from the bottom of the frame 10, the purpose of which will be presently apparent. Mounted for swinging movement within one end of the frame 10 upon rings 14 is an exit comprising a channel shaped rectangular frame 15 also having its wall provided with a screen wall 16. The opposite end of the frame having a pivot pin 17 extending transversely therethrough and the looped portions 18 formed upon the upper ends of arcuate shaped drops 19 having prongs 20 provided upon its lower end and outwardly extending rows of teeth 21 upon its opposite sides while a downwardly extending portion 22 from the looped portions 18 thereof terminating in forwardly extending stops 23 which when sunk into the dotted line position as clearly illustrated in Figure 2 of the drawing will engage the top of the frame 10 and limit the upward swinging movement thereof. A plurality of such drops 19 being mounted upon the pivot pin 17 as clearly illustrated in Figures 3 and 4 of the drawing. A pin 24 being positioned in the corresponding manner within the frame 10 directly behind the drops 19 to prevent retrograde movement while an additional pin 25 anchored to the frame 10 through the instrumentality of a chain or like and suitable fastening means such as indicated at 26 but inserted within registering openings 27 provided in the opposite sides of the frame 10 directly in advance of the drops 19 when an animal has been secured to lock the same whereby the frame 10 or trap may be carried by the handle 28 to any suitable place whereby the animal so caught, is to be extracted therefrom. An operating lever 29 having its forward end secured to the lower edge of the door 15 and extending rearwardly and upwardly within the enclosure defined and providing an offset portion 30 upon its opposite end and terminating in a looped finger engaging portion 31 upon the extremity thereof: such offset portion 30 being normally locked within an opening 32 provided in the corresponding end of the frame in order that the said exit door 15 will be held in the corresponding position to prevent the escape of the animal caught.

It will thus be noted from the foregoing description and accompanying drawing that one of the strips 23 provided upon one of the drops 19 is provided with a cutout portion 33 into which extends an appropriate portion of the operating lever 29 whereby the bait drop may be readily and easily swung upwardly into the dotted line position as clearly illustrated in Figure 2 of the drawing with no interference with respect to the locked portion of the operating lever 29.

In the use and operation of the present invention it is clearly apparent and manifest that owing to the configuration of the drops 19 they may be swung to permit entrance of an animal within the trap owing to their pivotal connection upon the pivot pin 17 and which will afterwards swing downwardly to its normal position and prevent the escape of the animal from the trap. The bottom of the trap having a door 34 provided thereon in order that the bait may be placed therein between its under side and the corresponding upper side of the frame 10 to arouse and entice the animal to enter the trap.

The invention is susceptible of various changes in its form, proportions and minor details of construction, and the right is herein reserved to make such changes as properly fall within the scope of the appended claim.

Having thus described the invention, what is claimed is:—

A trap of the character described comprising an elongated frame having screen walls including a screen top, a bottom included in said frame, a false bottom formed from screen wire and arranged above the bottom first mentioned to provide a bait compartment, a pivotally mounted normally locked exit door arranged at one end of the frame, a plurality of substantially arcuate shaped drops adapted to normally close the opposite end of said frame, teeth formed on the side edges of said drops and bottom thereof respectively, a loop formed on the upper ends of said drops, a pivot pin extending through said frame and received in the loops for pivotally mounting said drops in parallelism for movement in a vertical plane, forwardly extending stops formed on said drops below the loops thereof and adapted to engage the top of the frame to limit the movement of said drops, and a removably secured rod adapted to be passed through said frame for locking the drops in their closed position.

In testimony whereof I affix my signature.

GEORGE DEVEROW EARWOOD.